US011921845B2

(12) United States Patent
Kawauchi et al.

(10) Patent No.: US 11,921,845 B2
(45) Date of Patent: Mar. 5, 2024

(54) RISK EVALUATION AND COUNTERMEASURE PLANNING SYSTEM, AND RISK EVALUATION AND COUNTERMEASURE PLANNING METHOD

(71) Applicant: Hitachi, Ltd., Tokyo (JP)

(72) Inventors: Takashi Kawauchi, Tokyo (JP); Chinatsu Yamauchi, Tokyo (JP); Yiwen Chen, Tokyo (JP); Eriko Ando, Tokyo (JP)

(73) Assignee: HITACHI, LTD., Tokyo (JP)

( * ) Notice: Subject to any disclaimer, the term of this patent is extended or adjusted under 35 U.S.C. 154(b) by 230 days.

(21) Appl. No.: 17/428,678

(22) PCT Filed: Feb. 27, 2020

(86) PCT No.: PCT/JP2020/007999

§ 371 (c)(1),
(2) Date: Aug. 5, 2021

(87) PCT Pub. No.: WO2020/202934

PCT Pub. Date: Oct. 8, 2020

(65) Prior Publication Data

US 2022/0121739 A1 Apr. 21, 2022

(30) Foreign Application Priority Data

Mar. 29, 2019 (JP) ................................ 2019-067455

(51) Int. Cl.
*G06F 21/55* (2013.01)

(52) U.S. Cl.
CPC ........ *G06F 21/55* (2013.01); *G06F 2221/033* (2013.01)

(58) Field of Classification Search
CPC .... G06F 21/55; G06F 2221/033; G06F 21/57; G06F 21/577; H04W 12/67;
(Continued)

(56) References Cited

U.S. PATENT DOCUMENTS

2009/0024627 A1* 1/2009 King ..................... G06F 21/577 707/999.009
2011/0078797 A1* 3/2011 Beachem ............ H04L 63/1441 726/25

(Continued)

FOREIGN PATENT DOCUMENTS

JP 2005-135239 A 5/2005
JP 2005-242754 A 9/2005

(Continued)

OTHER PUBLICATIONS

Japanese Office Action received in corresponding Japanese Application No. 2019-067455 dated Jul. 5, 2022.

(Continued)

*Primary Examiner* — Farid Homayounmehr
*Assistant Examiner* — Suman Debnath
(74) *Attorney, Agent, or Firm* — Mattingly & Malur, PC

(57) ABSTRACT

The present invention is provided with a threat analysis processing unit that, on the basis of an analysis result from the vulnerability analysis unit, analyzes a threat to the system and outputs a threat analysis result; a countermeasure planning unit that, on the basis of the threat analysis result and vulnerability information, plans the countermeasure plan which reduces the impact of the vulnerability; a security test planning unit that plans the security test on the basis of the countermeasure plan; an evaluation calculation unit that performs an evaluation on the basis of the security test, and outputs an evaluation result; and a result processing unit that processes the evaluation result and generates a security countermeasure.

9 Claims, 17 Drawing Sheets

(58) Field of Classification Search
CPC .. H04W 12/12; H04W 84/12; H04L 63/1433; H04L 63/1441
See application file for complete search history.

(56) References Cited

U.S. PATENT DOCUMENTS

| | | | | |
|---|---|---|---|---|
| 2012/0180133 | A1* | 7/2012 | Al-Harbi ............. | H04L 63/1433 726/25 |
| 2014/0137257 | A1 | 5/2014 | Martinez et al. | |
| 2018/0260573 | A1* | 9/2018 | Nagatani ............... | G06F 21/577 |
| 2019/0087570 | A1* | 3/2019 | Sloane ................... | G06N 5/022 |
| 2019/0147161 | A1* | 5/2019 | Agarwal ................. | G06F 16/27 726/23 |

FOREIGN PATENT DOCUMENTS

| | | |
|---|---|---|
| JP | 2016-200991 A | 12/2016 |
| JP | 2017-111796 | 6/2017 |
| WO | 2008/004498 A1 | 1/2008 |

OTHER PUBLICATIONS

Ueda, T. et al., "Security Vulnerability Analysis Method Using Design Model", 2018 Symposium on Cryptography and Information Security, Jan. 26-26, 2018, pp. 1-8.
International Search Report PCT/JP2020/007999 dated Jun. 9, 2020.

* cited by examiner

FIG. 4

200 SPECIFICATION INFORMATION TABLE 201 202 203 204 205 206

| FUNCTION NUMBER | SPECIFICATION ITEM | SOFTWARE VERSION | ASSET | ASSET REQUIREMENT | LINK FUNCTION NUMBER |
|---|---|---|---|---|---|
| 1 | USB FUNCTION | USB3.0 | USB FUNCTION<br>MAP INFORMATION | SIL1<br>SIL1 | 5、9 |
| 2 | WIRELESS LAN FUNCTION | WLAP2.0 | WIRELESS LAN FUNCTION<br>MAP INFORMATION<br>UPDATE SOFTWARE (NAVIGATION FUNCTION)<br>UPDATE SOFTWARE (DRIVING ASSISTANCE HMI FUNCTION) | SIL1<br>SIL1<br>SIL1<br>SIL2 | 5、10 |
| 3 | MOBILE COMMUNICATION FUNCTION | MOBILE COMMUNICATION 2.0 | MOBILE COMMUNICATION FUNCTION<br>UPDATE SOFTWARE (NAVIGATION FUNCTION)<br>UPDATE SOFTWARE (DRIVING ASSISTANCE HMI FUNCTION) | SIL1<br>SIL1<br>SIL2 | 5、11 |
| 4 | CONTROL NW FUNCTION | CONTROL NW FUNCTION | CONTROL NW FUNCTION<br>VEHICLE INFORMATION | SIL2<br>SIL2 | 8、12 |
| 5 | FTP FUNCTION | FTP1.0 | FTP FUNCTION<br>UPDATE SOFTWARE (NAVIGATION FUNCTION)<br>UPDATE SOFTWARE (DRIVING ASSISTANCE HMI FUNCTION) | SIL1<br>SIL1<br>SIL2 | 1、2、3、6 |
| 6 | UPDATE FUNCTION | Update2.0 | UPDATE FUNCTION<br>MAP INFORMATION<br>UPDATE SOFTWARE (NAVIGATION FUNCTION)<br>UPDATE SOFTWARE (DRIVING ASSISTANCE HMI FUNCTION) | SIL1<br>SIL1<br>SIL1<br>SIL2 | 5、7、8 |
| 7 | NAVIGATION FUNCTION | NAVIGATION FUNCTION 3.0 | NAVIGATION FUNCTION<br>MAP INFORMATION<br>UPDATE SOFTWARE (NAVIGATION FUNCTION) | SIL1<br>SIL1<br>SIL1 | 6 |
| 8 | DRIVING ASSISTANCE HMI FUNCTION | DRIVING ASSISTANCE HMI FUNCTION 4.5 | DRIVING ASSISTANCE HMI FUNCTION<br>VEHICLE INFORMATION<br>UPDATE SOFTWARE (DRIVING ASSISTANCE HMI FUNCTION) | SIL2<br>SIL2<br>SIL2 | 4、6 |
| 9 | USB IF | — | — | — | — |
| 10 | WIRELESS LAN IF | — | — | — | — |
| ... | ... | ... | ... | ... | ... |

FIG. 5

300 ATTACK METHOD INFORMATION TABLE

| ATTACK METHOD NUMBER (311) | ATTACK METHOD (312) | RELATED FUNCTION (313) | RELATED ASSET (314) | RELATED VULNERABILITY (315) |
|---|---|---|---|---|
| 50 | CONNECTION DUE TO UNAUTHORIZED USE OF CONNECTION PASSWORD | WIRELESS LAN FUNCTION<br>MOBILE COMMUNICATION FUNCTION | FUNCTION | 522 PASSWORD THAT CAN BE EASILY GUESSED<br>640 ABUSE OF PASSWORD REOBTAINMENT IN CASE WHERE PASSWORD IS FORGOTTEN |
| 457 | ATTACK USING USB MEMORY | USB FUNCTION | FUNCTION | 284 INSUFFICIENT CONTROL OF USB PROTOCOL |
| 125 | FLOODING | FUNCTION | FUNCTION | 404 INSUFFICIENT COUNTERMEASURES FOR CASE WHERE USAGE LIMITATIONS ARE EXCEEDED<br>770 INSUFFICIENT LIMITATIONS ON USAGE CAPACITY |
| 113 | UNAUTHORIZED OPERATION | FTP FUNCTION | FUNCTION | 227 UNAUTHORIZED OPERATION |
| 186 | UNAUTHORIZED SOFTWARE UPDATE | UPDATE FUNCTION | INFORMATION (SOFTWARE) | 494 SOFTWARE UPDATE WITH NO VERSION CHECK |
| 76 | UNAUTHORIZED USE OF REWRITE FUNCTION | FUNCTION | INFORMATION (SOFTWARE) | 264 OBTAINMENT OF SOFTWARE REWRITE PRIVILEGE<br>272 SETTING MISTAKE FOR MINIMUM PRIVILEGE FOR SOFTWARE REWRITING |
| ... | ... | ... | ... | ... |

FIG. 6

400 SPECIFICATION ITEM - RELATED VULNERABILITY CORRESPONDENCE INFORMATION TABLE

| FUNCTION NUMBER (401) | SPECIFICATION ITEM (402) | ATTACK METHOD NUMBER (403) | RELATED ATTACK METHOD (404) | RELATED VULNERABILITY (405) |
|---|---|---|---|---|
| 1 | USB FUNCTION | 457 | ATTACK THAT USED USB MEMORY | 284 INSUFFICIENT LIMITS ON USB PROTOCOL SERVICE |
| 1 | USB FUNCTION | 125 | FUNCTION STOPPED DUE TO FLOODING | 404 INSUFFICIENT COUNTERMEASURES FOR CASE WHERE USAGE LIMITATIONS ARE EXCEEDED<br>770 INSUFFICIENT LIMITATIONS ON USAGE CAPACITY |
| 1 | USB FUNCTION | 10 | OBTAINMENT OF TRANSMISSION DATA | 201 EXPOSURE OF TRANSMISSION DATA<br>306 AUTHENTICATION DEFECT FOR TRANSMISSION DATA<br>311 CRYPTOGRAPHIC ERROR FOR TRANSMISSION DATA |
| 2 | WIRELESS LAN FUNCTION | 50 | CONNECTION DUE TO UNAUTHORIZED USE OF CONNECTION PASSWORD | 522 PASSWORD THAT CAN BE EASILY GUESSED<br>640 ABUSE OF PASSWORD REOBTAINMENT IN CASE WHERE PASSWORD IS FORGOTTEN |
| 2 | WIRELESS LAN FUNCTION | 125 | FUNCTION STOPPED DUE TO FLOODING | 404 INSUFFICIENT COUNTERMEASURES FOR CASE WHERE USAGE LIMITATIONS ARE EXCEEDED<br>770 INSUFFICIENT LIMITATIONS ON USAGE CAPACITY |
| 2 | WIRELESS LAN FUNCTION | 10 | OBTAINMENT OF TRANSMISSION DATA | 201 EXPOSURE OF TRANSMISSION DATA<br>306 AUTHENTICATION DEFECT FOR TRANSMISSION DATA<br>311 CRYPTOGRAPHIC ERROR FOR TRANSMISSION DATA |
| 4 | CONTROL NW FUNCTION | 125 | FUNCTION STOPPED DUE TO FLOODING | 404 INSUFFICIENT COUNTERMEASURES FOR CASE WHERE USAGE LIMITATIONS ARE EXCEEDED<br>770 INSUFFICIENT LIMITATIONS ON USAGE CAPACITY |
| 5 | FTP FUNCTION | 113 | UNAUTHORIZED OPERATION | 227 UNAUTHORIZED OPERATION |
| 5 | FTP FUNCTION | 125 | FUNCTION STOPPED DUE TO FLOODING | 404 INSUFFICIENT COUNTERMEASURES FOR CASE WHERE USAGE LIMITATIONS ARE EXCEEDED<br>770 INSUFFICIENT LIMITATIONS ON USAGE CAPACITY |
| 5 | FTP FUNCTION | 148 | DATA ALTERATION | 345 DATA AUTHENTICATION DEFECT |
| 6 | UPDATE FUNCTION | 186 | UNAUTHORIZED SOFTWARE UPDATE | 494 SOFTWARE UPDATE WITH NO VERSION CHECK |
| ... | ... | ... | ... | ... |
| 8 | DRIVING ASSISTANCE HMI FUNCTION | 76 | UNAUTHORIZED USE OF REWRITE FUNCTION | 264 PRIVILEGE ESCALATION<br>272 VIOLATION OF MINIMUM PRIVILEGE |
| | | | | |

FIG. 7

500 THREAT ANALYSIS INFORMATION TABLE 501 502 503 504 505 506 507

| FUNCTION NUMBER | SPECIFICATION ITEM | ASSET | ATTACK SCENARIO ITEM NUMBER | ENTRY FUNCTION NUMBER (FROM) | ATTACK TARGET FUNCTION NUMBER (TO) | THREAT EVENT |
|---|---|---|---|---|---|---|
| 1 | USB FUNCTION | USB FUNCTION | 1 | 9 | 1 | INHIBIT OPERATION FOR FUNCTION FOR LARGE AMOUNT OF ACCESS TO FUNCTION |
| 1 | USB FUNCTION | MAP INFORMATION | 2 | 9 | 1 | IMPERSONATE AS LEGITIMATE COUNTERPARTY TO TRANSMIT ALTERED INFORMATION TO FUNCTION |
| 2 | WIRELESS LAN FUNCTION | WIRELESS LAN | 3 | 10 | 2 | INHIBIT OPERATION FOR FUNCTION FOR LARGE AMOUNT OF ACCESS TO FUNCTION |
| 2 | WIRELESS LAN FUNCTION | MAP INFORMATION | 4 | 10 | 2 | IMPERSONATE AS LEGITIMATE COUNTERPARTY TO TRANSMIT ALTERED INFORMATION TO FUNCTION |
| 2 | WIRELESS LAN FUNCTION | UPDATE SOFTWARE (NAVIGATION FUNCTION) | 5 | 10 | 2 | IMPERSONATE AS LEGITIMATE COUNTERPARTY TO TRANSMIT ALTERED INFORMATION TO FUNCTION |
| 2 | WIRELESS LAN FUNCTION | UPDATE SOFTWARE (DRIVING ASSISTANCE HMI FUNCTION) | 6 | 10 | 2 | IMPERSONATE AS LEGITIMATE COUNTERPARTY TO TRANSMIT ALTERED INFORMATION TO FUNCTION |
| ... | ... | ... | ... | ... | ... | ... |
| 8 | DRIVING ASSISTANCE HMI FUNCTION | DRIVING ASSISTANCE HMI FUNCTION | 15 | 9、10、11、12 | 7 | INHIBIT OPERATION FOR FUNCTION FOR LARGE AMOUNT OF ACCESS TO FUNCTION |
| 8 | DRIVING ASSISTANCE HMI FUNCTION | VEHICLE INFORMATION | 16 | 12 | 7 | PRETEND TO BE CORRECT TRANSMISSION SOURCE TO TRANSMIT ALTERED INFORMATION TO FUNCTION AND CAUSE WRONG INFORMATION TO BE DISPLAYED |
| 8 | DRIVING ASSISTANCE HMI FUNCTION | UPDATE SOFTWARE (DRIVING ASSISTANCE HMI FUNCTION) | 17 | 10、11 | 7 | PERFORM UPDATE OF ALTERED SOFTWARE TO FUNCTION |
| ... | ... | ... | ... | ... | ... | ... |

FIG. 8

600 ATTACK ROUTE TABLE

| FUNCTION NUMBER (601) | SPECIFICATION ITEM (602) | ENTRY FUNCTION (FROM) (603) | ATTACK ROUTE (604) |
|---|---|---|---|
| 1 | USB FUNCTION | 9. USB IF | 9→1 |
| 2 | WIRELESS LAN FUNCTION | 10. WIRELESS LAN IF | 10→2 |
| 3 | MOBILE COMMUNICATION FUNCTION | 11. MOBILE COMMUNICATION IF | 11→3 |
| 4 | CONTROL NW FUNCTION | 12. CONTROL NW IF | 12→4 |
| 5 | FTP FUNCTION | 10. WIRELESS LAN IF | 10→2→5 |
| 5 | FTP FUNCTION | 11. MOBILE COMMUNICATION IF | 11→3→5 |
| 6 | UPDATE FUNCTION | 9. USB IF | 9→1→6 |
| 6 | UPDATE FUNCTION | 10. WIRELESS LAN IF | 10→2→5→6 |
| 6 | UPDATE FUNCTION | 11. MOBILE COMMUNICATION IF | 11→3→5→6 |
| 7 | NAVIGATION FUNCTION | 9. USB IF | 9→1→6→7 |
| 7 | NAVIGATION FUNCTION | 10. WIRELESS LAN IF | 10→2→5→6→7 |
| 7 | NAVIGATION FUNCTION | 11. MOBILE COMMUNICATION IF | 11→3→5→6→7 |
| 8 | DRIVING SUPPOPRT HMI FUNCTION | 9. USB IF | 9→1→6→8 |
| 8 | DRIVING SUPPOPRT HMI FUNCTION | 10. WIRELESS LAN IF | 10→2→5→6→8 |
| 8 | DRIVING SUPPOPRT HMI FUNCTION | 11. MOBILE COMMUNICATION IF | 11→3→5→6→8 |
| 8 | DRIVING SUPPOPRT HMI FUNCTION | 12. CONTROL NW IF | 12→4→8 |
| ... | ... | ... | ... |

FIG.9A

700 EVALUATION TABLE 701 702 703 704 705

| ATTACK SCENARIO ITEM NUMBER | THREAT EVENT | ASSET | OCCURRENCE PROBABILITY | ATTACK ROUTE |
|---|---|---|---|---|
| 1 | INHIBIT OPERATION FOR FUNCTION FOR LARGE AMOUNT OF ACCESS TO FUNCTION | USB FUNCTION | 0.0001 | 9→1 |
| 2 | IMPERSONATE AS LEGITIMATE COUNTERPARTY TO TRANSMIT ALTERED INFORMATION TO FUNCTION | MAP INFORMATION | 0.0001 | 9→1 |
| 3 | INHIBIT OPERATION FOR FUNCTION FOR LARGE AMOUNT OF ACCESS TO FUNCTION | WIRELESS LAN FUNCTION | 0.0001 | 10→2 |
| 4 | IMPERSONATE AS LEGITIMATE COUNTERPARTY TO TRANSMIT ALTERED INFORMATION TO FUNCTION | MAP INFORMATION | 0.0001 | 10→2 |
| 5 | IMPERSONATE AS LEGITIMATE COUNTERPARTY TO TRANSMIT ALTERED INFORMATION TO FUNCTION | UPDATE SOFTWARE (NAVIGATION FUNCTION) | 0.0001 | 10→2 |
| 6 | IMPERSONATE AS LEGITIMATE COUNTERPARTY TO TRANSMIT ALTERED INFORMATION TO FUNCTION | UPDATE SOFTWARE (DRIVING ASSISTANCE HMI FUNCTION) | 0.0001 | 10→2 |
| ... | ... | ... | | ... |
| 15-1 | INHIBIT OPERATION FOR FUNCTION FOR LARGE AMOUNT OF ACCESS TO FUNCTION | DRIVING ASSISTANCE HMI FUNCTION | 0.0001 | 9→1→6→8 |
| 15-2 | INHIBIT OPERATION FOR FUNCTION FOR LARGE AMOUNT OF ACCESS TO FUNCTION | DRIVING ASSISTANCE HMI FUNCTION | 0.0001 | 10→2→5 →6→8 |
| 15-3 | INHIBIT OPERATION FOR FUNCTION FOR LARGE AMOUNT OF ACCESS TO FUNCTION | DRIVING ASSISTANCE HMI FUNCTION | 0.0001 | 11→3→5 →6→8 |
| 16 | PRETEND TO BE CORRECT TRANSMISSION SOURCE TO TRANSMIT ALTERED INFORMATION TO FUNCTION AND CAUSE WRONG INFORMATION TO BE DISPLAYED | VEHICLE INFORMATION | 0.0001 | 12→4→8 |
| 17-1 | PERFORM UPDATE OF ALTERED SOFTWARE TO FUNCTION | UPDATE SOFTWARE (DRIVING ASSISTANCE HMI FUNCTION) | 0.0001 | 9→1→6→8 |
| 17-2 | PERFORM UPDATE OF ALTERED SOFTWARE TO FUNCTION | UPDATE SOFTWARE (DRIVING ASSISTANCE HMI FUNCTION) | 0.0001 | 10→2→5 →6→8 |
| ... | ... | ... | | ... |

FIG. 9B

| 706 | 707 | 708 | 709 | 710 |
|---|---|---|---|---|
| OCCURRENCE LOCATION: ATTACK METHOD PROCEDURE 1 | OCCURRENCE LOCATION: ATTACK METHOD PROCEDURE 2 | OCCURRENCE LOCATION: ATTACK METHOD PROCEDURE 3 | OCCURRENCE LOCATION: ATTACK METHOD PROCEDURE 4 | ... |
| FUNCTION 1: 457, ATTACK THAT USED USB MEMORY | FUNCTION 1: 125, FUNCTION STOPPED DUE TO FLOODING | - | - | - |
| FUNCTION 1: 10, OBTAINMENT OF TRANSMISSION DATA | FUNCTION 1: 457, ATTACK THAT USED USB MEMORY | - | - | - |
| FUNCTION 2: 50, CONNECTION DUE TO UNAUTHORIZED USE OF CONNECTION PASSWORD | FUNCTION 2: 125, FUNCTION STOPPED DUE TO FLOODING | - | - | - |
| FUNCTION 2: 50, CONNECTION DUE TO UNAUTHORIZED USE OF CONNECTION PASSWORD | FUNCTION 2: 255, ALTERATION OF DATA STRUCTURE | - | - | - |
| FUNCTION 2: 50, CONNECTION DUE TO UNAUTHORIZED USE OF CONNECTION PASSWORD | FUNCTION 2: 255, ALTERATION OF DATA STRUCTURE | - | - | - |
| FUNCTION 2: 50, CONNECTION DUE TO UNAUTHORIZED USE OF CONNECTION PASSWORD | FUNCTION 2: 255, ALTERATION OF DATA STRUCTURE | - | - | - |
| ... | ... | ... | ... | ... |
| FUNCTION 1: 457, ATTACK THAT USED USB MEMORY | FUNCTION 1: 125, FUNCTION STOPPED DUE TO FLOODING | FUNCTION 6: 125, FUNCTION STOPPED DUE TO FLOODING | FUNCTION 8: 125, FUNCTION STOPPED DUE TO FLOODING | - |
| FUNCTION 2: 50, CONNECTION DUE TO UNAUTHORIZED USE OF CONNECTION PASSWORD | FUNCTION 5: 125, FUNCTION STOPPED DUE TO FLOODING | FUNCTION 6: 125, FUNCTION STOPPED DUE TO FLOODING | FUNCTION 8: 125, FUNCTION STOPPED DUE TO FLOODING | - |
| FUNCTION 3: 50, CONNECTION DUE TO UNAUTHORIZED USE OF CONNECTION PASSWORD | FUNCTION 5: 125, FUNCTION STOPPED DUE TO FLOODING | FUNCTION 6: 125, FUNCTION STOPPED DUE TO FLOODING | FUNCTION 8: 125, FUNCTION STOPPED DUE TO FLOODING | - |
| FUNCTION 4: 10, OBTAINMENT OF TRANSMISSION DATA | FUNCTION 8: 255, ALTERATION OF DATA STRUCTURE | - | - | - |
| FUNCTION 1: 10, OBTAINMENT OF TRANSMISSION DATA | FUNCTION 1: 457, ATTACK THAT USED USB MEMORY | FUNCTION 6: 186, UNAUTHORIZED SOFTWARE UPDATE | FUNCTION 8: 76, UNAUTHORIZED USE OF REWRITE FUNCTION | - |
| FUNCTION 2: 50, CONNECTION DUE TO UNAUTHORIZED USE OF CONNECTION PASSWORD | FUNCTION 2: 50, CONNECTION DUE TO UNAUTHORIZED USE OF CONNECTION PASSWORD | FUNCTION 5: 345, DATA AUTHENTICATION DEFECT | FUNCTION 6: 186, UNAUTHORIZED SOFTWARE UPDATE | FUNCTION 8: 76, UNAUTHORIZED USE OF REWRITE FUNCTION |
| ... | ... | ... | ... | ... |

FIG. 10

800 COUNTERMEASURE TABLE

| ATTACK METHOD NUMBER (801) | ATTACK METHOD (802) | COUNTERMEASURE (803) | COUNTERMEASURE LOCATION (804) | COUNTERMEASURE COST (805) | EFFECT (806) |
|---|---|---|---|---|---|
| 50 | CONNECTION DUE TO UNAUTHORIZED USE OF CONNECTION PASSWORD | 1. TEMPORARY PASSWORD COUNTERMEASURE | 2. WIRELESS LAN FUNCTION<br>3. MOBILE COMMUNICATION FUNCTION | High | High |
| 457 | ATTACK THAT USED USB MEMORY | 2. WHITELISTING | 1. USB FUNCTION | Low | Low |
| 125 | FUNCTION STOPPED DUE TO FLOODING | 3. ABNORMAL TERMINATION COUNTERMEASURE DATA RESTRICTION COUNTERMEASURE | 1. USB FUNCTION<br>2. WIRELESS LAN FUNCTION<br>3. MOBILE COMMUNICATION FUNCTION<br>4. CONTROL NW FUNCTION<br>5. FTP FUNCTION<br>6. UPDATE FUNCTION<br>7. NAVIGATION FUNCTION<br>8. DRIVING ASSISTANCE HMI FUNCTION | High | High |
| 113 | UNAUTHORIZED OPERATION | 4. ACCESS CONTROL<br>5. WHITELISTING | 5. FTP FUNCTION | Low | Low |
| 186 | UNAUTHORIZED SOFTWARE UPDATE | 6. VERSION CHECK<br>7. ALTERATION DETECTION<br>8. CRYPTOGRAPHIC COUNTERMEASURE | 6. UPDATE FUNCTION | High | High |
| 76 | UNAUTHORIZED USE OF REWRITE FUNCTION | 9. OPERATOR AUTHENTICATION<br>10. PRIVILEGE MANAGEMENT | 7. NAVIGATION FUNCTION<br>8. DRIVING ASSISTANCE HMI FUNCTION | Low | Low |
| ... | ... | ... | ... | ... | ... |

FIG. 11

900 TEST TABLE 901 902 903 904

| TEST NUMBER | TEST TYPE | EFFECT | COST |
|---|---|---|---|
| 1 | CHECKLIST | Low | Low |
| 2 | FUZZING TEST | Medium | Medium |
| 3 | DESIGN REVIEW | Low | Low |
| 4 | PENETRATION TEST | High | High |

Figure 15:
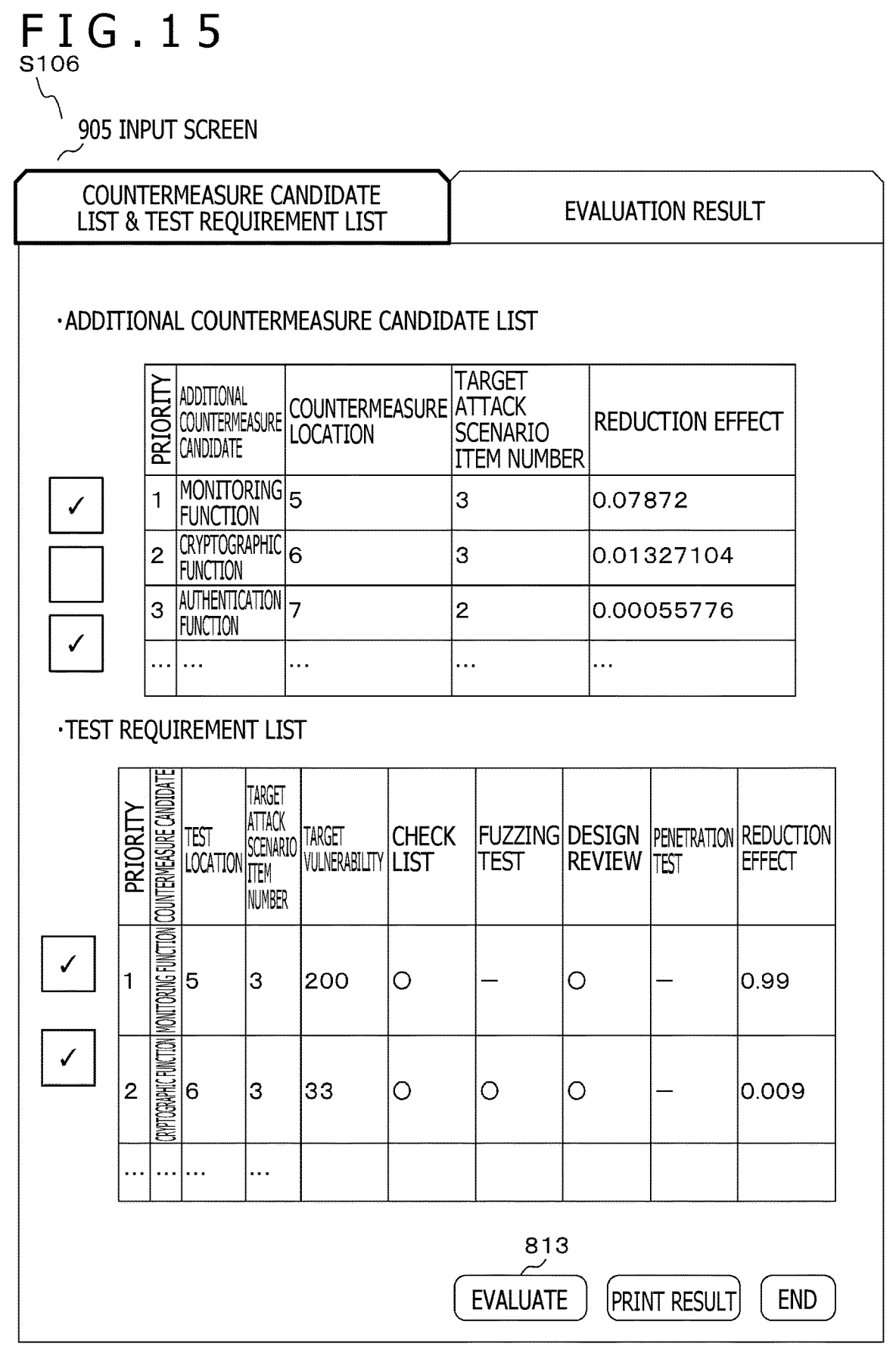

905 INPUT SCREEN

COUNTERMEASURE CANDIDATE LIST & TEST REQUIREMENT LIST | EVALUATION RESULT

·ADDITIONAL COUNTERMEASURE CANDIDATE LIST

| | PRIORITY | ADDITIONAL COUNTERMEASURE CANDIDATE | COUNTERMEASURE LOCATION | TARGET ATTACK SCENARIO ITEM NUMBER | REDUCTION EFFECT |
|---|---|---|---|---|---|
| ✓ | 1 | MONITORING FUNCTION | 5 | 3 | 0.07872 |
| ☐ | 2 | CRYPTOGRAPHIC FUNCTION | 6 | 3 | 0.01327104 |
| ✓ | 3 | AUTHENTICATION FUNCTION | 7 | 2 | 0.00055776 |
| | ... | ... | ... | ... | ... |

·TEST REQUIREMENT LIST

| | PRIORITY | COUNTERMEASURE CANDIDATE | TEST LOCATION | TARGET ATTACK SCENARIO ITEM NUMBER | TARGET VULNERABILITY | CHECK LIST | FUZZING TEST | DESIGN REVIEW | PENETRATION TEST | REDUCTION EFFECT |
|---|---|---|---|---|---|---|---|---|---|---|
| ✓ | 1 | MONITORING FUNCTION | 5 | 3 | 200 | ○ | — | ○ | — | 0.99 |
| ✓ | 2 | CRYPTOGRAPHIC FUNCTION | 6 | 3 | 33 | ○ | ○ | ○ | — | 0.009 |
| | ... | ... | ... | ... | | | | | | |

813

EVALUATE | PRINT RESULT | END

Figure 16:
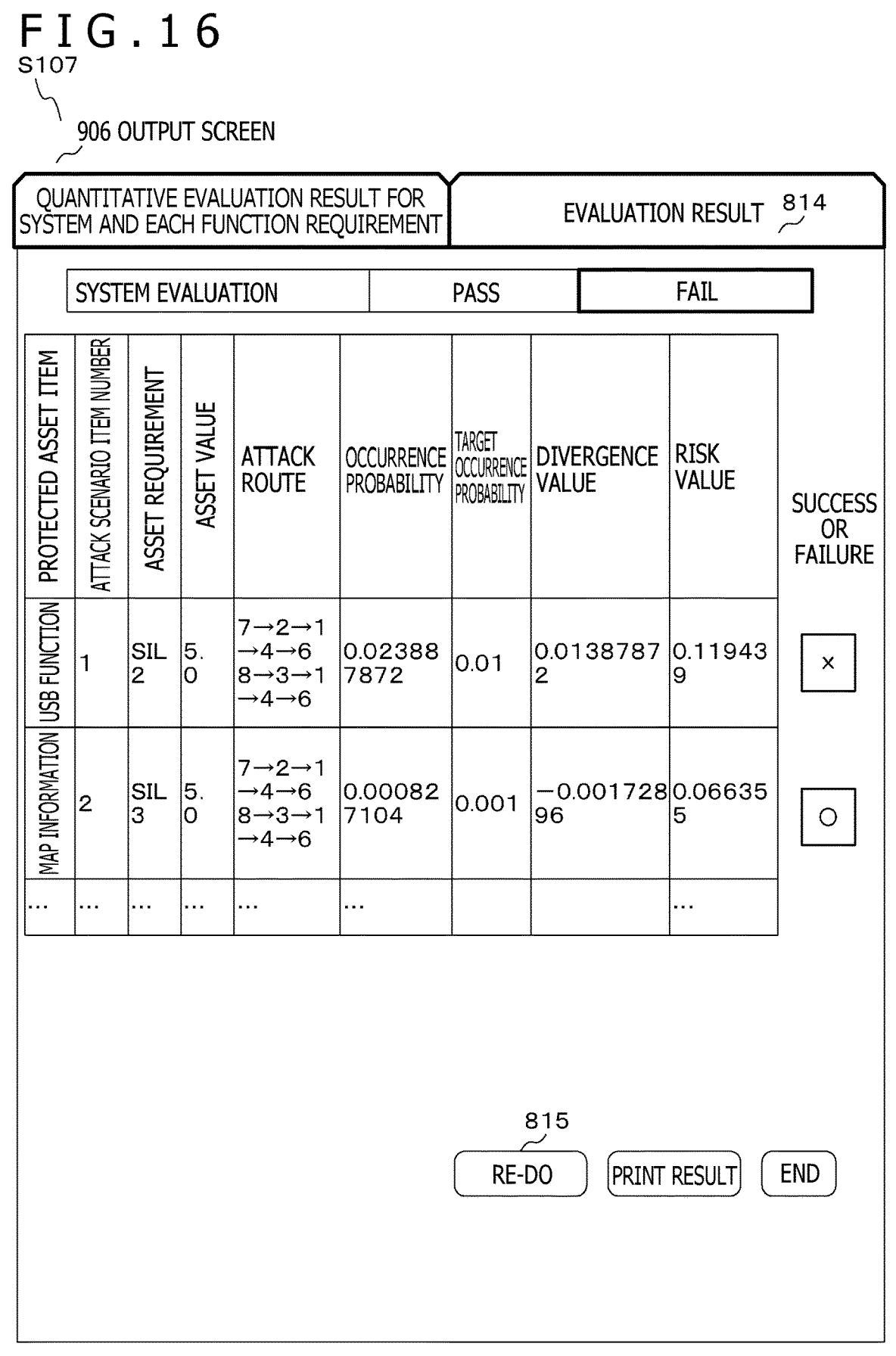

906 OUTPUT SCREEN

| QUANTITATIVE EVALUATION RESULT FOR SYSTEM AND EACH FUNCTION REQUIREMENT | EVALUATION RESULT 814 |
|---|---|

| SYSTEM EVALUATION | PASS | FAIL |
|---|---|---|

| PROTECTED ASSET ITEM | ATTACK SCENARIO ITEM NUMBER | ASSET REQUIREMENT | ASSET VALUE | ATTACK ROUTE | OCCURRENCE PROBABILITY | TARGET OCCURRENCE PROBABILITY | DIVERGENCE VALUE | RISK VALUE | SUCCESS OR FAILURE |
|---|---|---|---|---|---|---|---|---|---|
| USB FUNCTION | 1 | SIL 2 | 5.0 | 7→2→1→4→6<br>8→3→1→4→6 | 0.023887872 | 0.01 | 0.01387872 | 0.119439 | × |
| MAP INFORMATION | 2 | SIL 3 | 5.0 | 7→2→1→4→6<br>8→3→1→4→6 | 0.000827104 | 0.001 | −0.00172896 | 0.066355 | ○ |
| ... | ... | ... | ... | ... | ... | | | ... | |

815

RE-DO | PRINT RESULT | END

RISK EVALUATION AND COUNTERMEASURE PLANNING SYSTEM, AND RISK EVALUATION AND COUNTERMEASURE PLANNING METHOD

TECHNICAL FIELD

The present invention relates to a risk evaluation and countermeasure planning system, and a risk evaluation and countermeasure planning method.

BACKGROUND ART

In recent years, techniques for realizing services that improve control system efficiency or services that perform software updates or appropriately update information used, by connecting communication apparatuses that obtain external information with control systems for factories, automobiles, and the like, have started to spread. In such an IoT (Internet of Things) system, there is a greater risk of suffering a cyber attack from outside of these devices, and improved security performance is requested.

Furthermore, software that forms a part of these devices has defects, referred to as software vulnerabilities (hereinafter referred to as vulnerabilities), such as flaws or specification problems in computer programs.

Accordingly, from the design stage to the development stage, service providers, users, and manufacturers of devices that form part of an IoT system are requested to reduce the possibility of the occurrence of an event that impacts a control system due to a security attack by correcting vulnerabilities through the implementation of security tests or the addition of security countermeasures to a product.

In addition, in a case where a new vulnerability is discovered after shipment of a product, if there is an impact on a service provided by an IoT system, measures such as software updates are requested.

However, there is a problem in that how far to implement security countermeasures must rely on the findings of experts, and opinions differ depending on the expert.

To solve this problem, Patent Document 1 describes a technique for supporting security countermeasures for which it is possible to verify the cost-effectiveness of a combination of security countermeasures.

PRIOR ART DOCUMENT

Patent Document

Patent Document 1: JP-2016-200991-A

SUMMARY OF THE INVENTION

Problem to be Solved by the Invention

However, with the security countermeasure selection support technique described in Patent Document 1, only the cost-effectiveness of a combination of security countermeasures is inspected, and no determination is made to as to whether a vulnerability impacts an asset or a service provided by an IoT system. Accordingly, with Patent Document 1, it is difficult to determine how far to implement countermeasures or security tests to mitigate vulnerabilities.

The purpose of the present invention is to determine a countermeasure or security test for mitigating a vulnerability, in a risk evaluation and countermeasure planning system.

Means for Solving the Problem

A risk evaluation and countermeasure planning system according to an aspect of the present invention has a processing apparatus and a storage apparatus, plans a countermeasure plan pertaining to an attack on a system, and plans a security test, where, in this system, the storage apparatus stores a vulnerability database that stores vulnerability information pertaining to a vulnerability, and a product information database that stores product information, and the processing apparatus has an input/output processing unit into which design information is inputted, a vulnerability analysis unit that analyzes the vulnerability on the basis of the design information, a threat analysis processing unit that, on the basis of an analysis result from the vulnerability analysis unit, analyzes a threat to the system and outputs a threat analysis result, a countermeasure planning unit that, on the basis of the threat analysis result outputted from the threat analysis processing unit and the vulnerability information stored in the vulnerability database, plans the countermeasure plan which reduces an impact of the vulnerability, a security test planning unit that plans the security test on the basis of the countermeasure plan planned by the countermeasure planning unit, an evaluation calculation unit that performs an evaluation on the basis of the security test planned by the security test planning unit, and outputs an evaluation result, and a result processing unit that processes the evaluation result evaluated by the evaluation calculation unit, generates a security countermeasure as the product information, and stores the security countermeasure in the product information database.

A risk evaluation and countermeasure planning method according to an aspect of the present invention is for planning a countermeasure plan pertaining to an attack on a system, and planning a security test, the method including: analyzing a vulnerability on the basis of design information; analyzing a threat to the system on the basis of an analysis result and outputting a threat analysis result; planning, on the basis of the threat analysis result and vulnerability information, the countermeasure plan which reduces an impact of the vulnerability; planning the security test on the basis of the countermeasure plan; performing an evaluation on the basis of the security test and outputting an evaluation result; and processing the evaluation result and generating the security countermeasure.

Advantages of the Invention

By virtue of one aspect of the present invention, in a risk evaluation and countermeasure planning system, it is possible to determine a countermeasure or security test for mitigating a vulnerability.

BRIEF DESCRIPTION OF THE DRAWINGS

FIG. 4 is a view that illustrates a configuration of a specification information table.

FIG. 5 is a view that illustrates an example of a configuration of an attack method information table.

FIG. 6 is a view that illustrates an example of a configuration of a specification item—related vulnerability correspondence information table.

FIG. 7 is a view that illustrates an example of a configuration of a threat analysis information table.

FIG. 8 is a view that illustrates an example of a configuration of an attack route table.

FIG. 9A and FIG. 9B, taken together, are a view that illustrates an example of a configuration of an evaluation table.

FIG. 10 is a view that illustrates an example of a configuration of a countermeasure table.

FIG. 11 is a view that illustrates an example of a configuration of a test table.

FIG. 15 is a view that illustrates an example of an output screen for a countermeasure candidate list and a test requirement list of the system.

FIG. 16 is a view that illustrates an example of an output screen for an evaluation result of the system.

MODES FOR CARRYING OUT THE INVENTION

Using the drawings, description is given below regarding an embodiment.

Embodiment

In the embodiment, a risk evaluation and countermeasure planning system is directly connected to an input apparatus and an output apparatus that a user uses. Note that an asset that can be an attack target in the embodiment refers to two things: an information asset that is data held by a device that forms part of a system or IoT system impacted by an attack such as where an attacker exploits information, and a functional asset that is impacted by an attack for stopping functionality such as a DoS made by an attacker.

Figure 1:
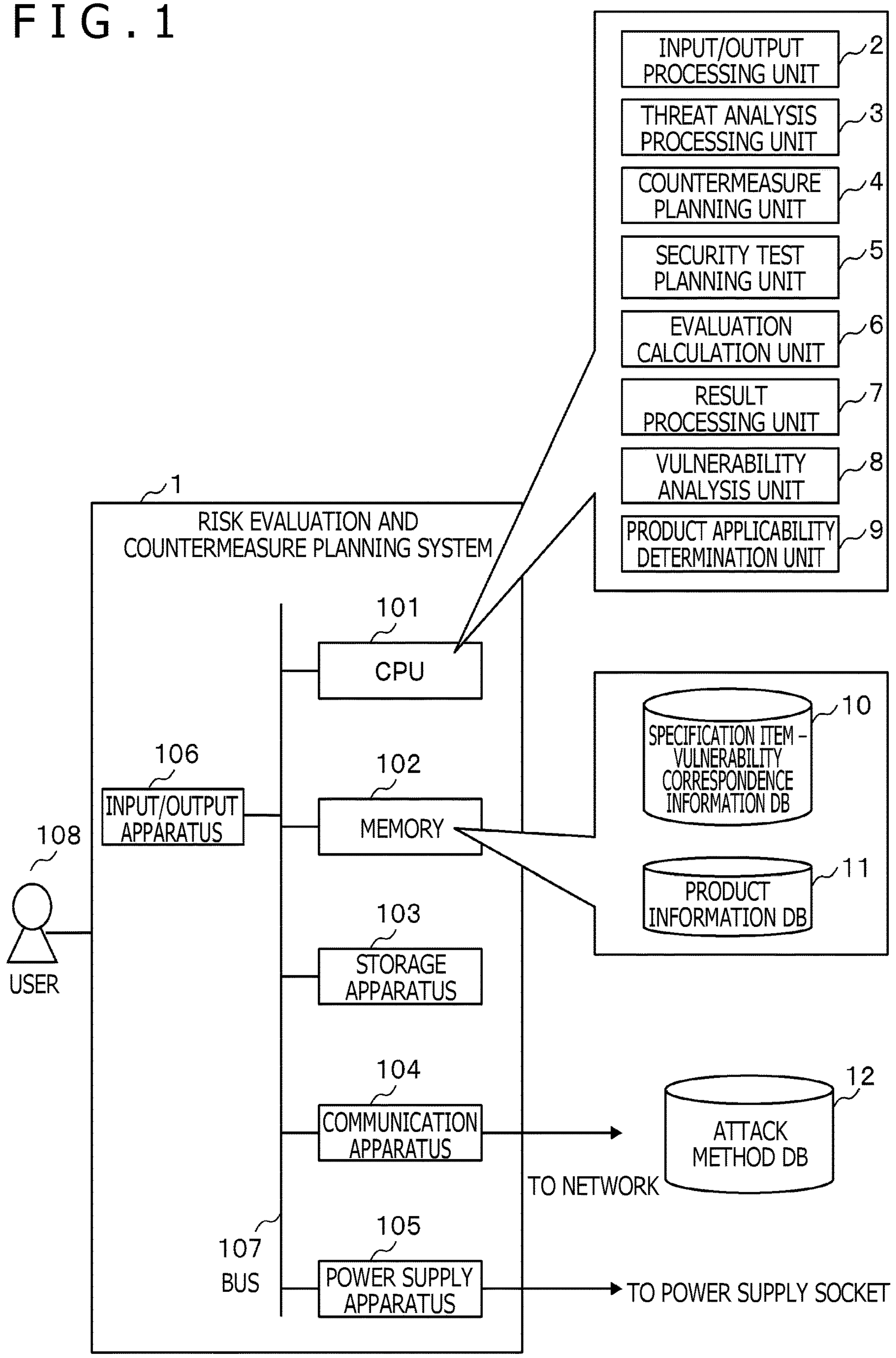
FIG. 1 is a view that illustrates a hardware configuration of a risk evaluation and countermeasure planning system according to an embodiment.

With reference to FIG. 1, description is given regarding the configuration of the risk evaluation and countermeasure planning system 1 according to the embodiment.

A risk evaluation and countermeasure planning system 1 is configured by a CPU (processing apparatus) 101, a memory 102, a storage apparatus 103, a communication apparatus 104, a power supply apparatus 105, an input/output apparatus 106, a bus 107, and a user 108. The user 108 inputs information to and outputs information from the risk evaluation and countermeasure planning system 1 via the input/output apparatus 106.

While operating, the CPU 101 holds an input/output processing unit 2, a threat analysis processing unit 3, a countermeasure planning unit 4, a security test planning unit 5, an evaluation calculation unit 6, a result processing unit 7, a vulnerability analysis unit 8, and a product applicability determination unit 9. The memory 102 holds a specification item—vulnerability correspondence information DB 10 and a product information DB 11. The communication apparatus 104 is connected, via a network, to an external attack method DB 12, which is described below.

Figure 2:
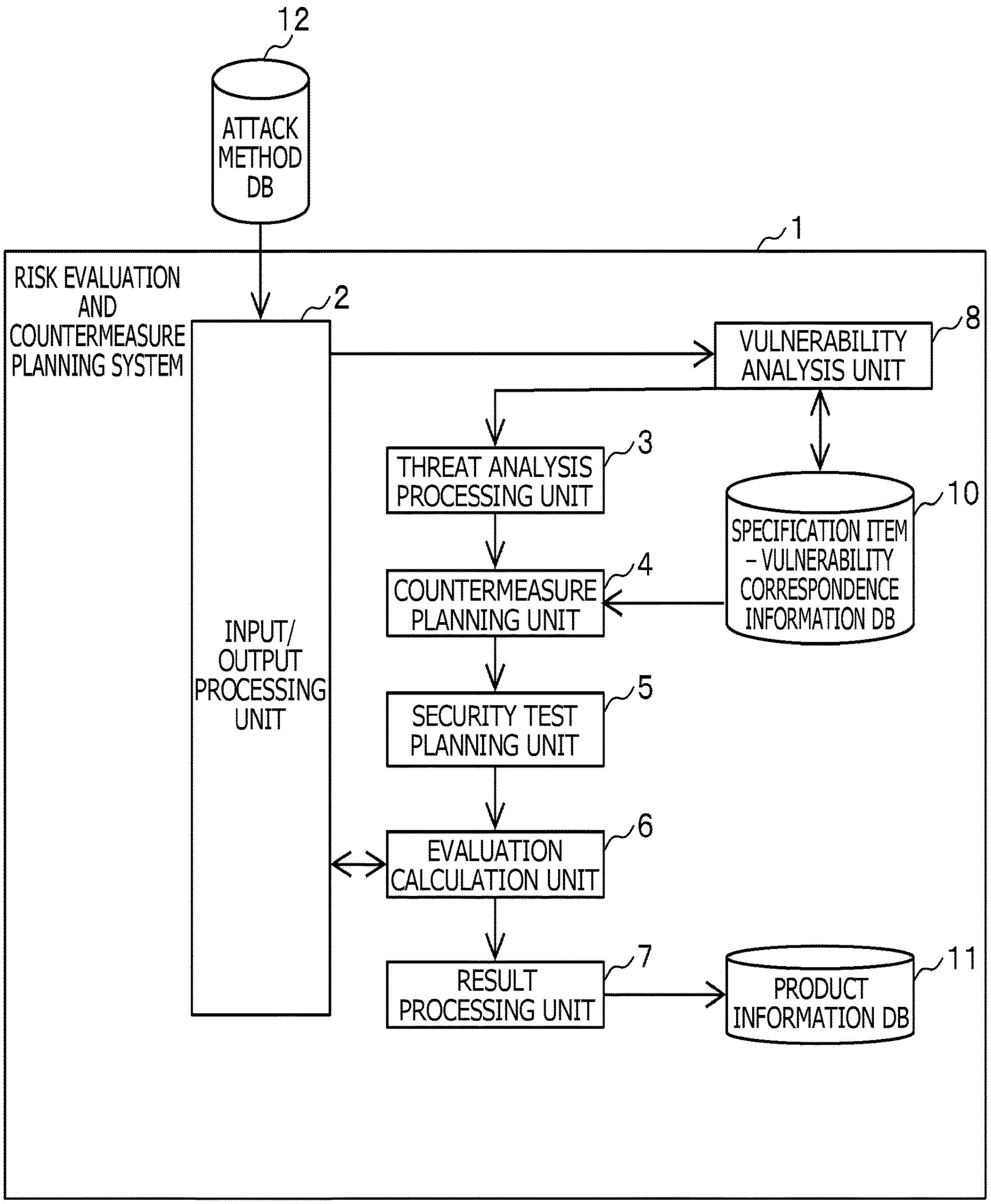
FIG. 2 is a view that illustrates a block view of the entirety of a risk evaluation and countermeasure planning system at a product design stage.

With reference to FIG. 2, description is given regarding the configuration of the risk evaluation and countermeasure planning system 1 at a product design stage.

The risk evaluation and countermeasure planning system 1 has the input/output processing unit 2, the threat analysis processing unit 3 into which design information is inputted from the input/output processing unit 2, the countermeasure planning unit 4 into which a threat analysis result is inputted from the threat analysis processing unit 3, the security test planning unit 5 into which a countermeasure plan candidate is inputted from the countermeasure planning unit 4, the evaluation calculation unit 6 into which a test requirement is inputted from the security test planning unit 5, the result processing unit 7 into which an evaluation result is inputted from the evaluation calculation unit 6, the product information DB 11 to which product information is outputted from the result processing unit 7, the vulnerability analysis unit 8 into which vulnerability information is inputted from the input/output processing unit 2, and the specification item—related vulnerability correspondence information DB 10 into which specification item—related vulnerability correspondence information is inputted from the vulnerability analysis unit 8.

The attack method DB 12 stores an attack method table 310. The specification item—related vulnerability correspondence information DB 10 stores a specification item—related vulnerability correspondence information table 400. The product information DB 11 stores product information including a security countermeasure or a countermeasure that has been implemented.

Figure 3:
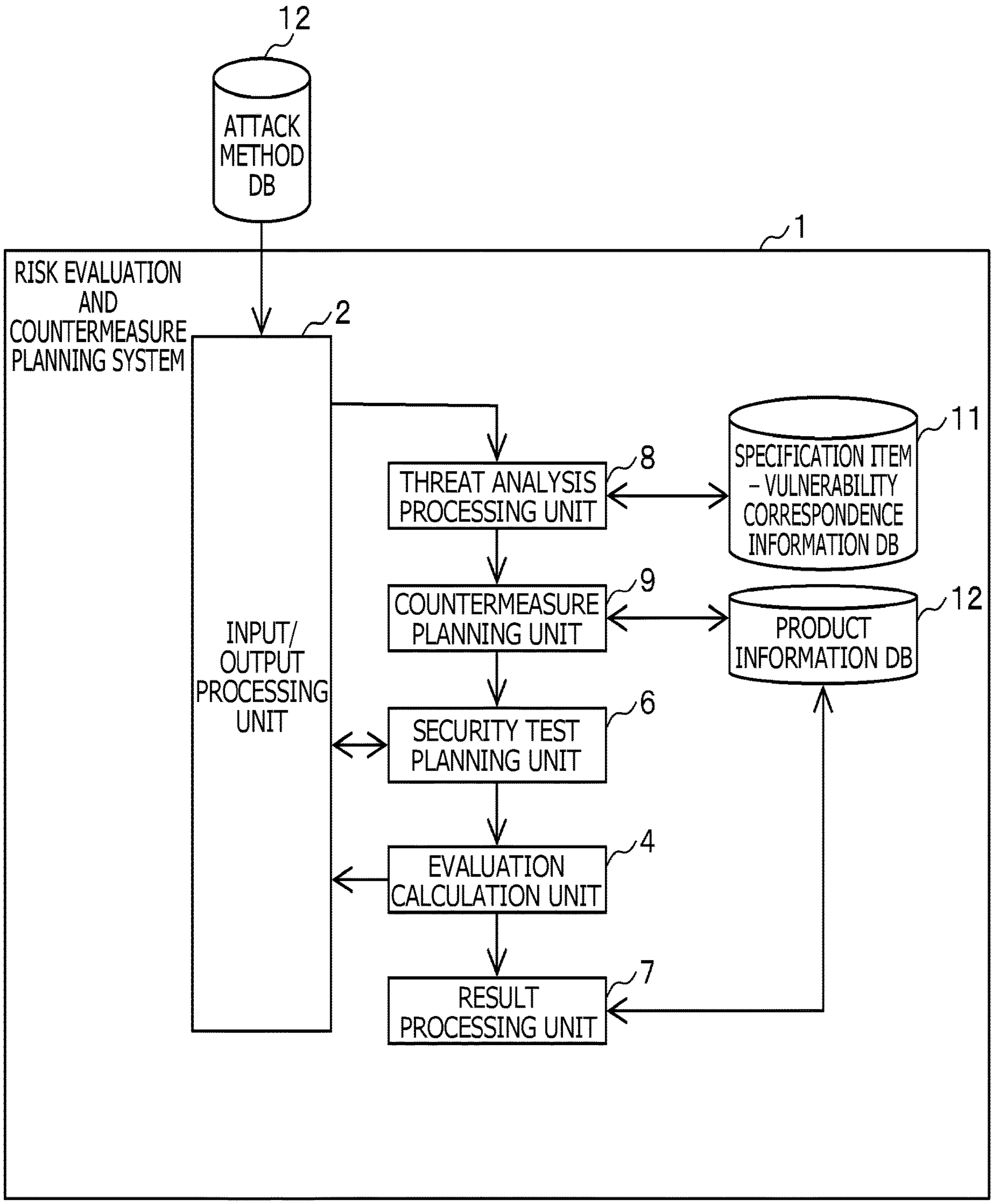
FIG. 3 is a view that illustrates a block view of the entirety of a risk evaluation and countermeasure planning system at a post-shipment vulnerability countermeasure stage.

With reference to FIG. 3, description is given regarding the configuration of the risk evaluation and countermeasure planning system 1 at a post-shipment vulnerability countermeasure stage.

The risk evaluation and countermeasure planning system 1 has the input/output processing unit 2 that receives information regarding new vulnerabilities and attack method information, the vulnerability analysis unit 8 that is inputted with vulnerability information from the input/output processing unit 2, the product applicability determination unit 9 that determines from the information regarding new vulnerabilities and past product information whether vulnerability information applies to a product, the evaluation calculation unit 6 that evaluates the impact of the vulnerability on the product in the case where the determination result is that the vulnerability applies to the product, a countermeasure planning unit 4 that plans a countermeasure for reducing the impact of the vulnerability, the product information DB 12 that stores product information including countermeasures that have been implemented, and the specification item—related vulnerability correspondence information DB 11 that updates and stores specification item—related vulnerability correspondence information on the basis of a result from the vulnerability analysis unit 8.

FIG. 4 illustrates an example of a configuration of a specification information table 200 that indicates, to a user, connections between functions and a function configuration of an IoT device that is an evaluation target and is described below.

The specification information table 200 includes a function number 201 which is a number for uniquely specifying a function number, a specification item 202 that indicates a function element, 203 which indicates a software version, an asset 204 which indicates functions and information held by the respective function, an asset requirement 205 that indicates the importance of the respective asset, and a link function number that indicates a function configuration of an IoT device.

In FIG. 4, for example, a wireless LAN function which has the function number 2 has the software version of WLAP 2.0, and has as assets a wireless LAN function, map information, update software (navigation function) and update software (driving assistance HMI function).

Asset requirements that respectively indicate the importance of these assets, namely wireless LAN function, map information, update software (navigation function), and update software (driving assistance HMI function), are SIL 1, SIL 1, SIL 1, and SIL 2. The update software (driving assistance HMI function) is indicated as being a more important asset requirement. The link function numbers indicates that the wireless LAN function which has the function number 2 is connected to the FTP function which has the function number 5 and the wireless LAN IF which has the function number 10.

SIL is an abbreviation for Safety Integrity Level, and is a target value for reducing, to be less than or equal to a certain level, the probability per hour that an attack which impacts the asset will occur and the asset will cease to function. For example, SIL 1 and SIL 2 are safety levels at which being safe can be rationally determined if the probability can be respectively kept to SIL 1>=a target value in the range of 10 the power of −6 and 10 to the power of −5, and SIL 2>=a target value in the range of 10 to the power of −7 and 10 to the power of −6.

The safety level is not limited to an occurrence probability. For example, the number of countermeasures, the difficulty of an attack, or the number of attack procedures that impact an asset may be used for the safety level. The safety level is not limited to this if it is possible to evaluate the probability of accessing an asset, the difficulty of accessing the asset, the difficulty of an attack process, and so on.

Figure 14:
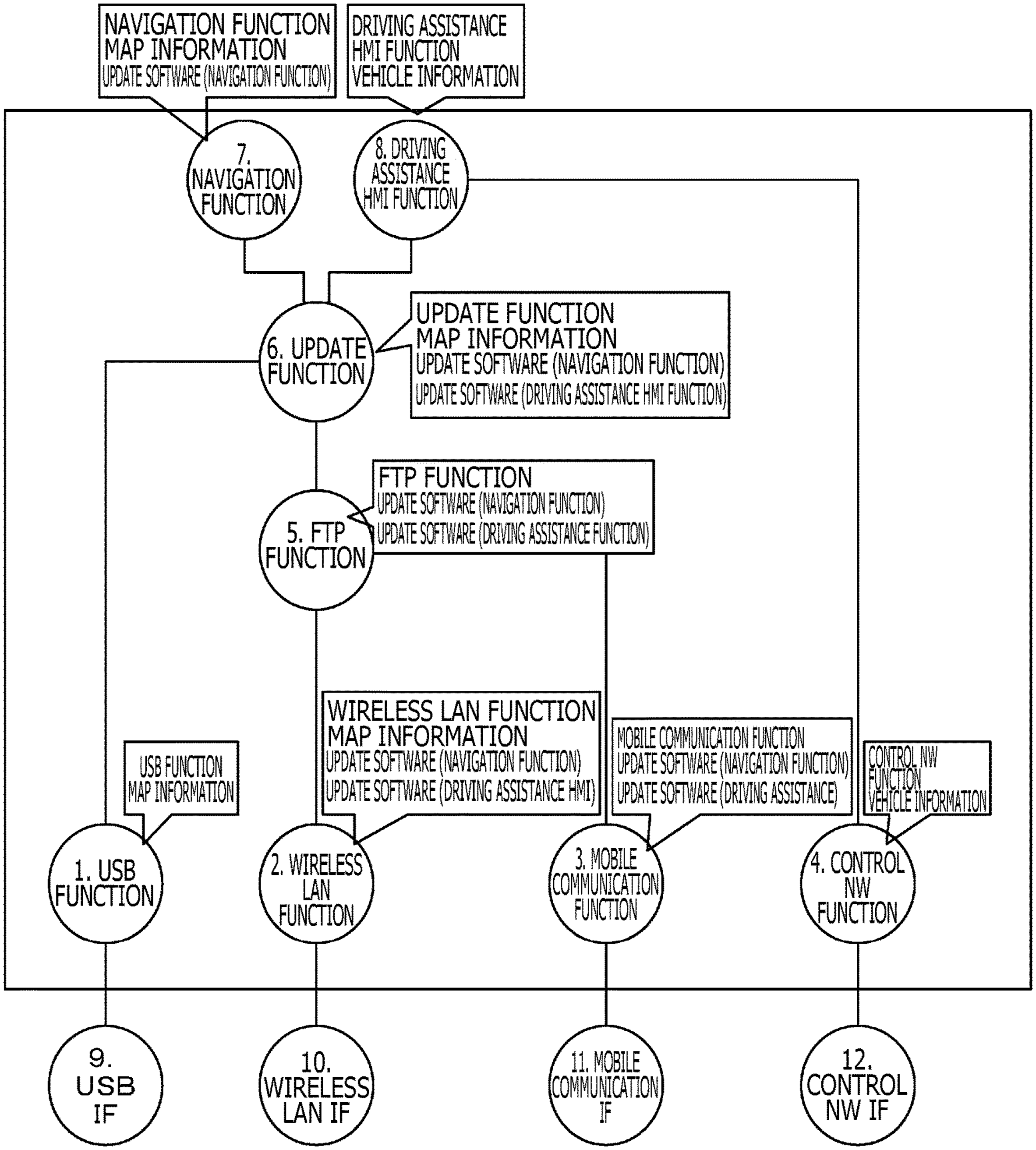
FIG. 14 is a view of a configuration of an IoT device that is an evaluation target.

The assets held by each function number are not assets that are held at all times, and also include information that is temporarily distributed along a route that makes up a connection described earlier. In addition, assets include not just information assets but functions that are executed by software or hardware. The function configuration indicated by the specification information table 200 of FIG. 4 is illustrated in FIG. 14 as a view of the configuration of an IoT device that is an evaluation target.

In addition, the premise for a cyber attack is that an external IF is the starting point of the attack. As illustrated in FIG. 14, for example, an asset of the USB function which has the function number 1 is attacked from the USB IF which has the function number 9. An asset of the wireless LAN function which has the function number 2 is attacked from the wireless LAN IF which has the function number 10. The mobile communication function which has the function number 3 is attacked from the mobile communication function IF which has the function number 11. The control NW function which has the function number 4 is attacked from the control NW IF which has the function number 12.

Furthermore, attacks from respective IFs follow a connected route in the function configuration, and assets of functions that are not directly connected to an IF are also attacked. For example, as illustrated in FIG. 14, from the USB IF which has the function number 9, the map information and update function of the update function which has the function number 6 as well as the map information and the navigation function of the navigation function which has the function number 7 are attacked in addition to the map information and the USB function which has the function number 1, which are assets held by the USB function.

With reference to FIG. 5, description is given regarding a configuration of the attack method information table 310 held by the attack method DB 12.

The attack method information table 310 indicates an attack method number 311 that uniquely specifies an attack method type, an attack method 312, a related function 313 that indicates a function that the attack method 311 could impact, an asset 314 that the attack method 311 could impact, and a related vulnerability 315 that indicates a vulnerability of software used when an attack is made with the attack method 311.

The attack method number 50 in FIG. 5, for example, indicates that, when attempting an unauthorized connection to the wireless LAN function or the mobile communication function of an IoT device, in order to make an unauthorized connection to the wireless LAN function or the mobile communication function, an attacker attempts to connect through unauthorized use of a connection password in the attack method 312 and, as the related vulnerability 315, uses a vulnerability with the vulnerability number 522 in which a password that can be easily guessed is set or a vulnerability with the vulnerability number 640 in which reobtainment of a password for a case where the password is forgotten is abused.

Normally, an attacker rarely uses a single attack method to impact assets of an IoT device, but instead combines a plurality of attack methods 312 to impact an asset. On the basis of threat analysis described below, a combination of attack methods is outputted from an asset composition and routes for an IoT device, and on the basis of a result of this, vulnerabilities which could be present in each function are specified.

The attack method information table 310 may be obtained from an external unit, or may be created by an analyst or implementer themself, envisioning attack methods 312 with respect to each function that has been implemented. The attack method 312 is not limited to simply the method for an attack, and may be a list of vulnerabilities and attack methods that are a result of analysis of cyber attack cases for which there was an impact in the past. An attack method list and a vulnerability list may be present separately.

With reference to FIG. 6, description is given regarding a configuration of the specification item—related vulnerability correspondence information table 400 which is held by the specification item—related vulnerability correspondence information DB 10.

The specification item—related vulnerability correspondence information table 400 is configured from a function number 401, a specification item 402, an attack method number 403, a related attack method 404, and a related vulnerability 405.

The function number 401 and the specification item 402 correspond to the function number 201 and the specification item 202 indicated in FIG. 4. With respect to each function number 401 and specification item 402 of the specification information in FIG. 6, what kind of attack is performed by an attacker and what vulnerability is attack is indicated.

The attack method number 403, related attack method 404, and related vulnerability 405 specify, with respect to a specification item 202 of the specification information table 200 illustrated in FIG. 4, an attack method 312 and a related vulnerability 315 with respect to the specification item 202 of the attack method information table 310 illustrated in FIG. 5.

With reference to FIG. 7, description is given regarding a configuration of a threat analysis information table 500 which is outputted by the threat analysis processing unit 3.

The threat analysis information table 500 is configured from an asset item number 501, an asset 502, an attack scenario number 504, an entry function number 505, an attack target function number 506, and a threat event 507. FIG. 7 illustrates a list that is a result of exhaustively analyzing the threat event 507 with respect to the asset 503 held by the specification item 502 of each function number 501 of the specification information.

The threat analysis information table 500 is a list that exhaustively specifies, with respect to the specification item 502 on the design specification and the asset 503, from which attack starting point (entry function number 505 (FROM)) is there an attack from and what impact (threat event 707) does the attack have on the IoT device.

For example, the assets held by the USB function which has the function number 1 in FIG. 7 are the USB function and the map information. In relation to the USB function, the threat event 507 for a case where the USB function which has the function number 1 is accessed with a large amount of data from the USB IF which has the function number 9 and the function is impaired corresponds to the attack scenario item number 1. In relation to the map information, the threat event 507 of tampered map information being transmitted from the USB IF which has the function number 9 to the USB function which has the function number 1 corresponds to the attack scenario item number 2.

For the threat event 507 of each attack scenario item number 504, an occurrence probability is evaluated from a combination of attack methods which is described below, a related vulnerability test method, and additional countermeasures for an attack route, and, by comparing the occurrence probability with a safety level occurrence probability, a determination is made as to whether there is a level of safety that can be permitted.

With reference to FIG. 8, description is given regarding a configuration of an attack route table 600.

The attack route table 600 is configured from a function number 601, a specification item 602, an entry function (FROM) 603, and an attack route 604. FIG. 8 illustrates attack routes for from which attack starting point and via which attack routes an attacker will make an attack on the specification item 602 of a specification.

For example, in FIG. 8, assets held by the driving assistance HMI function which has the function number 8 could be attacked on four attack routes. There is a possibility for an attack on the attack route 9→1→6→8 to be made from the USB IF which has the function number 9. There is a possibility for an attack on the attack route 10→2→5→6→8 to be made from the wireless LAN IF which has the function number 10. There is a possibility for an attack on the attack route 11→3→5→6→8 to be made from the mobile communication IF which has the function number 11. There is a possibility for an attack on the attack route 12→4→8 to be made from the control NW IF which has the function number 12.

In order to cause the threat event 507 for each attack scenario item number 504 indicated in FIG. 7, an attacker repeatedly, in the order for the route, succeeds in an attack that applies the related attack method 404 to the related vulnerability 405 with respect to the specification item 402 indicated in FIG. 6, for respective functions of specification items on the attack route.

With reference to FIG. 9A and FIG. 9B, description is given regarding a configuration of an evaluation table 700 which is outputted by the evaluation calculation unit 6 and includes attack scenarios indicating attack methods present for an attack route, and an order in which functions are attacked.

The evaluation table 700 is an evaluation table that exhaustively specifies attack scenarios that cause threat events with respect to all assets of an IoT device that is an analysis target.

The evaluation table 700 includes an attack scenario item number 701, a threat event 702, an asset 703, an occurrence probability 704, an attack route 705, and occurrence location: attack method procedures 706 through 710.

An attack scenario indicates, by the attack procedure and attack location, a threat event connected to an asset 703. A threat event indicates an event with the possibility of causing damage or having an impact due to a cyber attack. An asset includes information or a function that is impacted by the threat event. The occurrence probability indicates the probability per hour of the threat event occurring and the asset ceasing to function. The occurrence probability 704 indicates the probability of the attack methods on the attack route occurring in order.

For example, the occurrence probability 704 is obtained by setting the occurrence probability for one procedure to P, defining the occurrence probability=(P1× . . . Pn), with Pi=(1/number of all attack method types)×(number of vulnerabilities that attack procedure relates to/number of all vulnerability types), for example. In addition, the occurrence probability is evaluated after multiplying it by a coefficient based on the effect of an additional countermeasure described below or the effect of a test implementation plan with respect to each vulnerability. For example, with the coefficient set to 0.0001 where the effect of an additional countermeasure is high, 0.001 where the effect is medium, and 0.1 where the effect is low, calculation is performed by, for example, multiplication on the basis of the number of additional countermeasures or the number of vulnerabilities that an attack method relates to.

The occurrence probability evaluated here is not limited to this if the occurrence probability evaluates a threat event for a cyber attack. An occurrence probability obtained in this way is compared with the asset requirement 205 indicated in FIG. 4 by each asset 703, and it is determined whether the requirement is satisfied. The attack route 705 indicates through which route the asset 703 would be attacked, and is represented using the function number 601 of each specification item 602 indicated in FIG. 8.

For example, the attack route 9→1 indicates a route on which the USB function which has the function number 1 is attacked, with the USB IF which has the function number 9 as the attack starting point. The occurrence location: attack method procedures 706 through 710 indicate the order, along the attack route, of the attack occurrence location and attack method procedure for each function for the attacker.

For example, regarding the attack scenario item number 17-1 shown in FIG. 9A and FIG. 9B, an attack with the attack method being attack method number 10: obtainment of transmission data is made with respect to one related vulnerability among 201: exposure of transmission data, 306: authentication defect for transmission data, and 311: cryptographic defect for transmission data which are indicated in FIG. 6, is implemented against the USB function having the function 1 and is indicated by occurrence location: attack method procedure 1:706.

By attack method number 457: an attack that used a USB memory, an attack is implemented against a related vulnerability that is 284: insufficient limits on USB protocol service, on the USB function with function 1 indicated by attack method procedure 2: 707.

By attack method number 186: unauthorized software update, an attack is implemented against a related vulnerability that is 494: software update with no version check, on the update function with function 6 indicated by attack method procedure 3: 708.

By attack method number 76: unauthorized use of rewrite function, an attack is implemented against the related vulnerabilities 264: privilege escalation and 272 violation of minimum privilege, on the driving assistance HMI function of function 8 indicated by attack method procedure 4: 709.

By implementing attacks such as these, there is an update of tampered software to the function, which is a threat event, and update software (driving assistance HMI function) which is an asset is impacted.

With reference to FIG. 10, description is given regarding a configuration of a countermeasure table 800.

The countermeasure table 800 is configured from an attack method number 801, an attack method 802, a countermeasure 803, a countermeasure location 804, a countermeasure cost 805, and an effect 806. The countermeasure table 800 is a countermeasure list that indicates countermeasures and countermeasure locations with respect to attack methods of the attack method information table 310 illustrated in FIG. 5.

The attack method number 801 is a number that uniquely specifies an attack method indicated in FIG. 5. The attack method 802 indicates an attack method. The countermeasure 803 is a countermeasure for the attack method. The countermeasure location 804 indicates a location where the countermeasure can be implemented. The countermeasure cost 805 indicates the cost when the countermeasure is implemented, in three stages: high, medium, and low. Since the countermeasure cost 805 indicates the countermeasure cost at a time of implementation, it may be an implementation cost estimated from actual person-hours, and there is no limitation to this. Since the effect 806 indicates a reduction effect in a case of preventing the attack method 802, the effect 806 is indicated in three stages: high, medium, and low. It is sufficient if the effect 806 indicates, with respect to the attack method, the occurrence probability of a cyber attack, and there is no limitation to this.

With reference to FIG. 11, description is given regarding a configuration of a test table 900.

The test table 900 is a list of types of tests for determining whether or not there is a vulnerability, envisioning each attack method illustrated in FIG. 5. The test table 900 is configured from a test number 901, a test type 902, an effect 903, and a cost 904.

The test type 902 indicates the type of a test, such as a checklist, a fuzzing test, a design review, and a penetration test. For example, a checklist indicates a method by which a developer of an IoT device that is an analysis target performs implementation after confirming, from the specification item—related vulnerability correspondence information table 400 illustrated in FIG. 6, an attack method and related vulnerability with respect to a portion of specification items they are responsible for.

A fuzzing test indicates a test method by which a developer of an IoT device that is an analysis target decides parameters for testing an attack method and related vulnerability with respect to a portion of specification items they are responsible for.

A design review indicates a test method by which a developer of an IoT device that is an analysis target checks from a design document that there is no attack method and related vulnerability with respect to a portion of specification items they are responsible for.

A penetration test indicates a test method by which, after an IoT device is developed, an attack method with respect to a specification item is used to attack a related vulnerability in order to determine whether or not there is a vulnerability.

Since the effect 903 indicates an effect of mitigating the vulnerability, the effect 903 is indicated by three stages: high, medium, and low. It is sufficient if the effect 903 indicates an evaluation of reducing the impact of a vulnerability after each test has been implemented, and there is no limitation to this.

Figure 12:
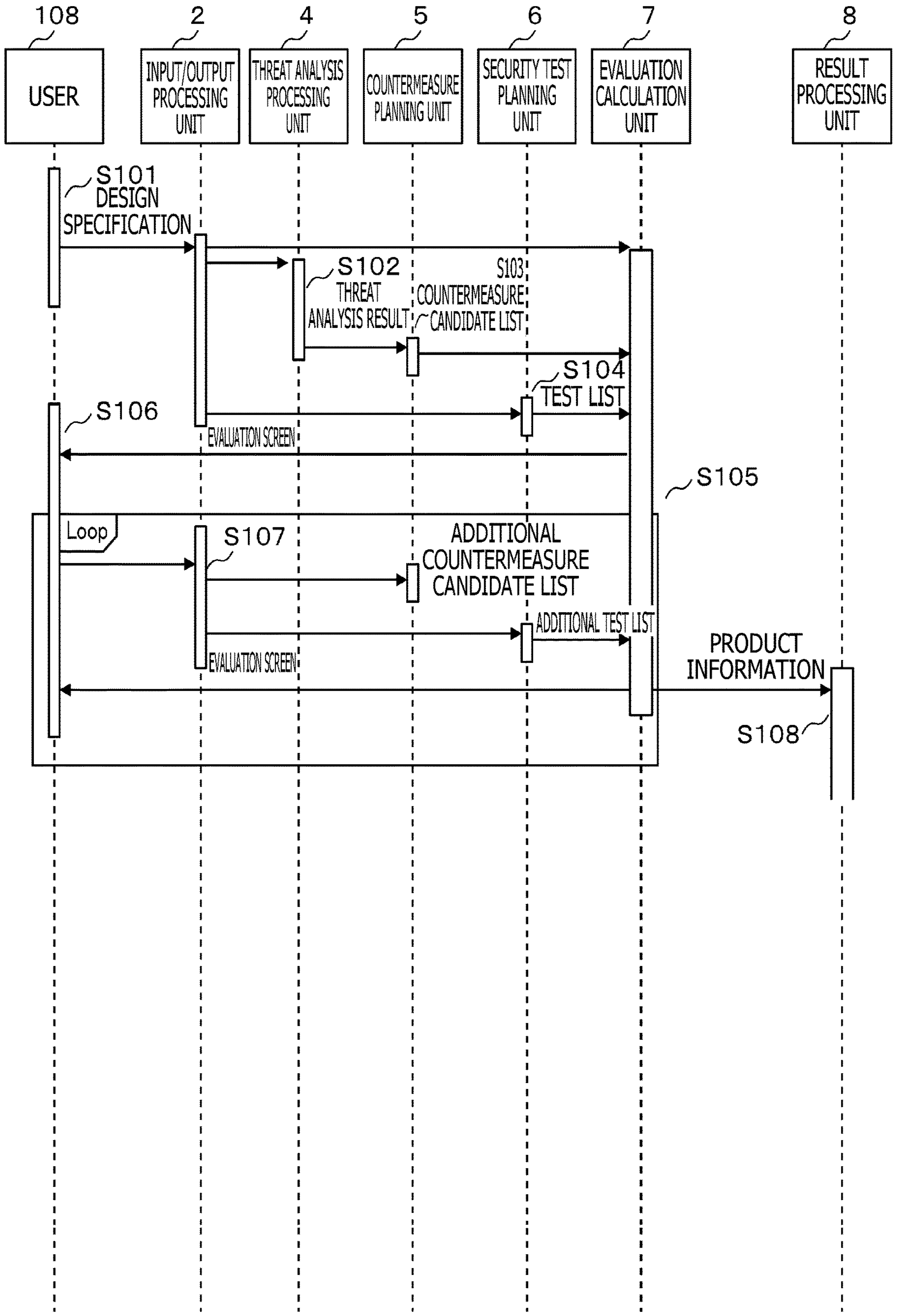
FIG. 12 is an overall sequence diagram for the risk evaluation and countermeasure planning system.

With reference to FIG. 12, description is given regarding a processing sequence for the risk evaluation and countermeasure planning system 1.

In step 101, the user 108 inputs the specification information stipulated in the specification information table 200 to the risk evaluation and countermeasure planning system 1, via the input/output processing unit 2 or the communication unit 80.

In step 102, the user 108 inputs the threat analysis information stipulated in the threat analysis information table 500 to the risk evaluation and countermeasure planning system 1, via the input/output processing unit 2 or the communication unit 80. The threat analysis information exhaustively specifies threat events with respect to all assets that a specification item holds.

In step 103, the user 108 inputs the countermeasure candidate list stipulated in the countermeasure table 800 illustrated in FIG. 10 to the risk evaluation and countermeasure planning system 1, via the input/output processing unit 2 or the communication unit 80. The user 108 selects a countermeasure and a countermeasure location, in accordance with an attack method indicated in FIG. 10.

In step 104, the user 108 inputs the test list stipulated in the test table 900 to the risk evaluation and countermeasure planning system 1, via the input/output processing unit 2 or the communication unit 80. A determination is made as to whether a test method adapted from the test table 900 illustrated in FIG. 11 applies to a vulnerability relating to an attack method indicated in FIG. 6, and a determination is made as to whether to implement a test for each vulnerability.

In step 105, from the attack route table 600 and specification item—related vulnerability correspondence information from the specification item—related vulnerability correspondence information DB 10 in the countermeasure planning unit 5 of the risk evaluation and countermeasure planning system 1, for each attack route of all protected asset items indicated in the evaluation table 700 illustrated in FIG. 9A and FIG. 9B, calculation is made for the occurrence probability of an threat event actually occurring from a vulnerability number relating to an attack method and the attack method, in accordance with countermeasures for the route and the order of attack methods for the route.

In step 106, in the case where the attack occurrence probability with respect to all assets in the evaluation table 700 outputted by the risk evaluation and countermeasure planning system 1 is less than a target occurrence probability, product information including a countermeasure candidate list and test candidates are outputted to the result processing unit 8, and the risk evaluation processing ends. In the case of not being less than the target occurrence probability, the processing transitions to step 107.

In step 107, in the case where the order of connections for attack type information in risk evaluation and countermeasure planning does not correspond to the attack methods 802 in the countermeasure table 800, the risk countermeasure planning unit 4 of the risk evaluation and countermeasure planning system 1 deletes risk evaluation and countermeasure planning that does not correspond. Note that step 105 and step 107 are repeatedly performed until the occurrence probability of all attacks on asset information that is the target of an attack becomes less than a requested occurrence probability.

In step 108, the result processing unit 7 of the risk evaluation and countermeasure planning system 1 saves the product information that includes the test list and the countermeasure candidate list that has been planned in the product information DB 12, and ends the processing.

Figure 13:
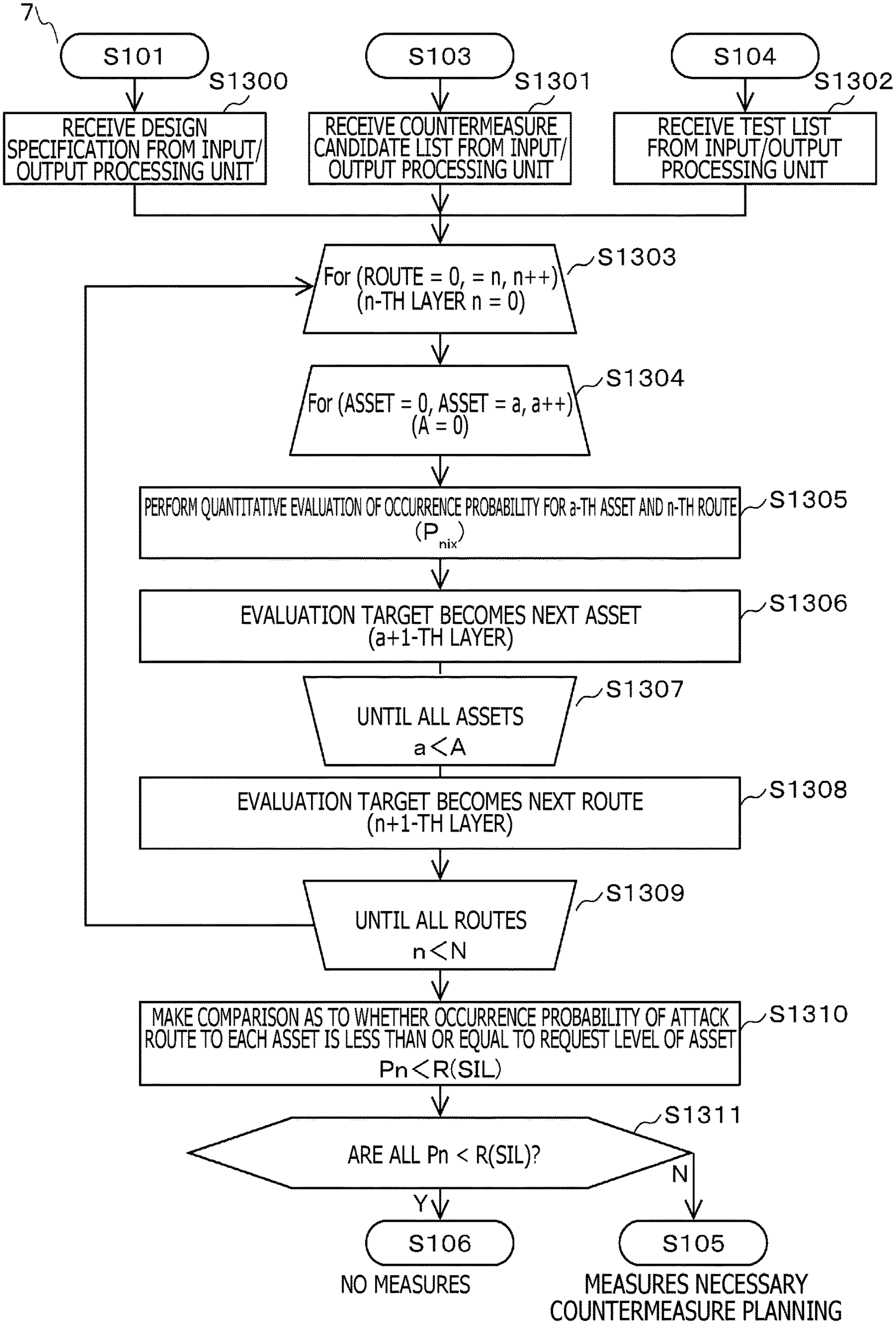
FIG. 13 is a system evaluation determination flow chart.

With reference to the flow chart of FIG. 13, description is given regarding the processing of the evaluation calculation unit 6 of the risk evaluation and countermeasure planning system 1.

The processing illustrated in FIG. 13 is performed, and a risk evaluation is performed for each route for all assets.

In step 1300, the evaluation calculation unit 6 of the risk evaluation and countermeasure planning system 1 receives a design specification from the input/output processing unit 2.

In step 1301, the evaluation calculation unit 6 of the risk evaluation and countermeasure planning system 1 receives a countermeasure candidate list from the input/output processing unit 2.

In step 1302, the evaluation calculation unit 6 of the risk evaluation and countermeasure planning system 1 receives a test list from the input/output processing unit 2.

In step 1303, the first attack route for the evaluation target is selected, and a transition is made to the next processing.

In step 1304, the first asset for the evaluation target is selected, and the next processing is transitioned to.

In step 1305, the occurrence probability for the n-th asset and n-th route of the risk evaluation and countermeasure planning system 1 is calculated, and the risk is evaluated from the occurrence probability and the asset value for the n-th asset.

In step 1306 and step 1307, the evaluation target transitions to the next asset. To have the second asset for the second and subsequent rounds of processing, implementation is made for the evaluation target asset n+1 until all assets have been made to be the evaluation target.

In step 1308 and step 1309, the evaluation target transitions to the next route. To have the second route for the second and subsequent rounds of processing, implementation is made for the evaluation target route n+1 until all attack routes have been made to be the evaluation target.

In step 1310, a comparison is made as to whether the occurrence probability for the attack route to each asset to each asset is less than or equal to a requested level for the asset.

In step 1311, in the case where the occurrence probability for all assets and the routes with respect to the assets is less than the requested occurrence probability, the processing transitions to step 106. If the requested occurrence probability is exceeded, the processing transitions to step 105.

With reference to FIG. 15, description is given regarding an example of input for an input screen 905 in a case where an inputter selects an additional countermeasure or an additional test on the basis of a system evaluation result.

The inputter inputs an additional countermeasure or additional test in S106. After inputting, the inputter selects an evaluation 813, and inputs additional countermeasures and test requirements until the occurrence probability of attacks with respect to all assets of the overall system are less than a target occurrence probability which is based on asset requirements. In the embodiment, display is given in an order for a risk reduction effect for the additional countermeasure candidate list or the test requirement list, but display may be performed on the basis of an index such as cost performance which is obtained by dividing an effect by cost, an order of largest test for implementing a test item or a planned countermeasure, or execution cost.

With reference to FIG. 16, description is given regarding an output example of an output screen 906 for a system evaluation result.

A risk evaluation and countermeasure planning priority evaluation result and a system evaluation result are created in S107.

The occurrence probability for each protected asset item is compared with the target occurrence probability which is based on an asset requirement, and determination is made as to whether the occurrence probability is less than the target occurrence probability. In a case where the risk evaluation result is that the occurrence probability with respect to all protected assets of the system satisfies the target occurrence probability, the evaluation result 814 for the system is "pass."

The method of calculating an evaluation value is not limited to a specific calculation method as long as priorities are assigned for risk evaluation and countermeasure planning.

In addition, by preparing a plurality of methods of calculating an evaluation value and making it so that an administrator can make a selection, it becomes possible for the administrator to compare and evaluate each priority of the risk evaluation and countermeasure planning in accordance with the selected calculation method. As a result, usage is possible when estimating a test design or making an explanation to a customer.

By virtue of the embodiment described above, it is possible to determine whether or not to implement sufficiently necessary security countermeasures or security tests that are based on the quantitative evaluation of whether it is possible for an attack to occur.

REFERENCE SIGNS DESCRIPTION

1: Risk evaluation and countermeasure planning system
2: Input/output processing unit
3: Threat analysis processing unit
4: Countermeasure planning unit
5: Security test planning unit
6: Evaluation calculation unit
7: Result processing unit
8: Vulnerability analysis unit
9: Product applicability determination unit
10: Specification item—vulnerability correspondence information DB
11: Product information DB
101: CPU
102: Memory
103: Storage apparatus
104: Communication apparatus
105: Power supply apparatus
106: Input/output apparatus
107: Bus
108: User

The invention claimed is:

1. A risk evaluation and countermeasure planning system comprising:

a storage apparatus configured to store:

a vulnerability database that stores vulnerability information pertaining to a vulnerability, and a product information database that stores product information; and a processing apparatus including a memory and a processor coupled to the memory, the memory storing instructions that when executed by the processor, configures the processor to:

receive an input of design information, analyze the vulnerability on a basis of the design information to generate an analysis result, on a basis of the analysis result, analyze a threat to the system and output a threat analysis result, on a basis of the output threat analysis result and the vulnerability information stored in the vulnerability database, plan a countermeasure plan which reduce an impact of the vulnerability, plan a security test on a basis of the countermeasure plan, perform an evaluation on a basis of the security test planned and output an evaluation result, process the evaluation result, generate a security countermeasure as the product information, and store the security countermeasure as the product information database, in a case where information regarding new vulnerabilities is input after product shipment, determine, from the information regarding new vulnerabilities and past product information, whether the information regarding new vulnerabilities applies to a product that forms a part of the system, in a case that a result of the determination is that the information regarding new vulnerabilities applies to the product, evaluate an impact of the new vulnerabilities on the product, and determine whether an additional countermeasure is necessary by comparing the impact of the new vulnerabilities on the system with a requirement with respect to an asset value, in a case where determination is that the additional countermeasure is necessary, plan the additional countermeasure for reducing the impact of the new vulnerabilities, and generate the additional countermeasure as the product information, and store the product information in the product information database.

2. The risk evaluation and countermeasure planning system according to claim 1, wherein the processor is configured to:

on a basis of a plurality of components of the system, a connection relation between the plurality of components, and the vulnerability information which relates to the components, generate an attack route connected to the components from a starting point for the attack, and on the basis of an order of attack methods present for the attack route, the vulnerability which relates to the attack methods, and the security test, generate an asset value and an occurrence probability of a threat event occurring, the asset value and occurrence probability being held by each of the components, and plan an additional countermeasure for reducing the occurrence probability to be an occurrence probability that is less than or equal to a requirement with respect to the asset value.

3. The risk evaluation and countermeasure planning system according to claim 1, wherein the processor is configured to:

create a priority by calculating an evaluation value for the countermeasure plan.

4. The risk evaluation and countermeasure planning system according to claim 1, wherein the processor is configured to:

on the basis of the analysis result, obtain a combination of the attack method from the asset value and the attack route, and specify the vulnerability which could be present in the component.

5. The risk evaluation and countermeasure planning system according to claim 1, wherein the processor is configured to:

generate an attack scenario that indicates the attack method present for the attack route, and an order in which the components are attacked, and from the attack scenario, specify an attack pattern which causes a threat event for the asset value of the product that forms a part of the system.

6. The risk evaluation and countermeasure planning system according to claim 1, wherein the processor is configured to:

determine whether an occurrence probability for the attack route with respect to the asset value is less than or equal to a requested level for the asset value, determine that the countermeasure plan is unnecessary in a case where the occurrence probability is less than or equal to the requested level, and determine that the countermeasure plan is necessary in a case where the occurrence probability exceeds the requested level.

7. The risk evaluation and countermeasure planning system according to claim 1, further comprising:

a display coupled to the processor, wherein the processor is configured to:

display, on the display, as a list, a candidate for an additional countermeasure plan and a test requirement for the security test, and display, on an output screen, the output evaluation result.

8. A risk evaluation and countermeasure planning method for planning a countermeasure plan pertaining to an attack on a system, and planning a security test, the method comprising:

analyzing a vulnerability on a basis of design information;

analyzing a threat to the system on a basis of an analysis result and outputting a threat analysis result;

planning, on a basis of the threat analysis result and vulnerability information, the countermeasure plan which reduces an impact of the vulnerability;

planning the security test on a basis of the countermeasure plan;

performing an evaluation on a basis of the security test and outputting an evaluation result;

processing the evaluation result and generating a security countermeasure;

in a case where information regarding new vulnerabilities is input after product shipment, determining, from the information regarding new vulnerabilities and past product information, whether the information regarding new vulnerabilities applies to a product that forms a part of the system;

in a case that a result of the determination is that the information regarding new vulnerabilities applies to the product, evaluating an impact of the new vulnerabilities on the product, and determining whether an additional countermeasure is necessary by comparing the impact of the new vulnerabilities on the system with a requirement with respect to an asset value;

in a case where determination is that the additional countermeasure is necessary, planning the additional countermeasure for reducing the impact of the new vulnerabilities; and generating the additional countermeasure as the product information, and store the product information in the product information database.

9. The risk evaluation and countermeasure planning method according claim 8, wherein on a basis of a plurality of components of the system, a connection relation between the plurality of components, and the vulnerability information which relates to the components, an attack route connected to the components from a starting point for the attack is generated, and on a basis of an order of attack methods present for the attack route, the vulnerability which relates to the attack methods, and the security test, an asset value and an occurrence probability of a threat event occurring are generated, the asset value and occurrence probability being held by each of the components, and an additional countermeasure for reducing the occurrence probability to be an occurrence probability that is less than or equal to a requirement with respect to the asset value is planned.

* * * * *